(12) United States Patent
Darbee

(10) Patent No.: US 7,995,835 B1
(45) Date of Patent: *Aug. 9, 2011

(54) METHOD AND APPARATUS FOR ALTERING TWO-DIMENSIONAL IMAGES USING THREE-DIMENSIONAL INFORMATION

(76) Inventor: Paul V Darbee, Coto de Caza, CA (US)

( * ) Notice: Subject to any disclaimer, the term of this patent is extended or adjusted under 35 U.S.C. 154(b) by 1033 days.

This patent is subject to a terminal disclaimer.

(21) Appl. No.: 11/414,858

(22) Filed: May 1, 2006

Related U.S. Application Data

(63) Continuation-in-part of application No. 10/263,235, filed on Oct. 2, 2002, now Pat. No. 7,043,074.

(51) Int. Cl.
*G06T 19/00* (2006.01)
*G06T 5/00* (2006.01)
(52) U.S. Cl. ......................... 382/154; 382/254
(58) Field of Classification Search .................. 382/154, 382/263, 264, 254
See application file for complete search history.

(56) References Cited

U.S. PATENT DOCUMENTS

| | | | | |
|---|---|---|---|---|
| 5,311,329 A | * | 5/1994 | Haeberli et al. | 358/448 |
| 5,715,334 A | * | 2/1998 | Peters | 382/254 |
| 5,982,953 A | * | 11/1999 | Yanagita et al. | 382/294 |
| 7,043,074 B1 | * | 5/2006 | Darbee | 382/154 |

OTHER PUBLICATIONS

Baxes. "Digital Image Processing: Principles and Applications." John Wiley & Sons, Inc., 1994, pp. 346-347.*

* cited by examiner

*Primary Examiner* — Jon Chang
(74) *Attorney, Agent, or Firm* — Thomas R. Vigil

(57) ABSTRACT

The method and apparatus for enhancing digital image data is to be know as DarbeeVision™, or DVn™ for short, and includes a method and an apparatus for enhancing images by embedding three-dimensional information into them. It works for movies, TV, videogames, print—in fact, for any image—whether from natural sources or generated by a computer. By combining the information contained in two source images, one for each eye, the DarbeeVision algorithm adds significant additional information content to any ordinary two-dimensional image. As a result DarbeeVision strikingly enhances images visually, imparting a strong sense of depth that is particularly pronounced when viewing moving images. The DarbeeVision method for enhancing images and the apparatus for implementing the method can be used during image recording and as a post-production procedure.

39 Claims, 3 Drawing Sheets

One-sided Darbee Transform, DTO

METHOD AND APPARATUS FOR ALTERING TWO-DIMENSIONAL IMAGES USING THREE-DIMENSIONAL INFORMATION

CROSS-REFERENCE TO RELATED APPLICATIONS

This application is a continuation-in-part of U.S. patent application Ser. No. 10/263,235, filed Oct. 2, 2002, now U.S. Pat. No. 7,043,074.

BACKGROUND OF THE INVENTION

1. Field of the Invention

The present invention relates to image enhancement and stereo image viewing.

2. Description of the Prior Art

Stereo vision involves each eye receiving an image from a viewpoint displaced from the other eye by the human inter-ocular distance, about 2½ to 3 inches. Because of the inter-ocular spacing, most scenes present different information to each eye due to the differing geometric perspective. It is this difference which gives us a sense of depth when viewing a scene. Stereo still and motion cameras have been used for many years to capture images as they would be seen from a left and a right eye. As is well known, presenting such left and right images to the left and right eyes respectively, using appropriate apparatus, results in a strong sense of depth for the viewer. Unfortunately, the apparatus needed to present the separate images to each eye is often cumbersome, involving polarized glasses, LCD shutter glasses, lenticular screens, holograms, or rotating mirrors. Previously, no direct-view method of presenting images without additional apparatus has been found for images commonly presented by movies, television, computer screens, or print.

BRIEF SUMMARY OF THE INVENTION

One aspect of the present invention is to provide both a method and apparatus for embedding three-dimensional information into two-dimensional images. While not 3D in the sense of presenting different information to each eye, the method embeds the additional information in such a way that depth cues are received by the human visual system, without the perception of objectionable artifacts that would make the image appear "double." In fact, the images appear enhanced, in the sense of seeming sharper and more "vibrant."

The method and apparatus of the present invention are referred to as DarbeeVision™, abbreviated DVn™, and is principally a method for remarkably enhancing images by embedding three-dimensional information into them. It works for movies, TV, videogames, print—in fact, for any image—whether from natural sources or generated by a computer.

By combining the information contained in two source images, one for each eye, the DVn algorithm adds significant additional information content to any ordinary 2D image. By examining the typical file sizes of original images versus DVn-processed images, one sees that the additional information amounts to approximately 16% on average. Because the additional information comes from another view of the same image, DarbeeVision strikingly enhances images visually, imparting a strong sense of depth that is particularly pronounced when viewing moving images. After experiencing images in DarbeeVision, one senses that ordinary images lack clarity and seem more than ever flat.

Because it depends on adding 3D information, the DVn algorithm requires that the source material have both a left-eye and a right-eye view. This means that in the case of natural images, the scene must be shot with a stereo camera—that is, with a camera with two lenses, one for each eye. In the case of computer-synthesized scenes, such as those produced by video games or 3D design software, two viewports must be designated, separated by a distance equal to a typical human's inter-ocular spacing.

The actual combination of the two images is achieved with the help of the Darbee Transform, a mathematical procedure that processes one of the images and then combines the two images together. The Darbee Transform avoids the typical annoying visual artifacts that would occur with a naïve combination of two images, for instance by simply adding them together.

Insights into brain theory and neurophysiology inspired the Darbee Transform. Binocular creatures possess brains that combine the signals arising in the retina of each eye in a structure called the lateral geniculate nucleus, or LGN. The LGN interdigitates the two retinal images and generates signals that eventually drive the muscles of the eyes to minimize the disparity, or difference between the images, by converging the eyes at the point of attention. LGN neurons compute the image disparity with the help of a process known as lateral inhibition, a phenomenon found ubiquitously throughout nervous systems of all kinds.

The Darbee Transform capitalizes on these phenomena, and the inventor believes that it thereby processes images in a way that would have been computed anyhow by neural circuits in the pathway between the retinas and the visual cortex. Looking on natural brain processes as a filter, DVn simply presents to the filter input that which the filter is designed to pass to its output anyhow, so the information goes, as it were, straight through. As a partial validation of this explanation as to why DarbeeVision works, it is interesting to note that viewing DVn images with only one eye seems to enhance the perceived 3D effect. In that case, it is not possible to explore the image normally by changing the convergence point of both eyes, so the brain is "fooled" into believing that the image is stereo, as if it had been perceived using both eyes.

Images can be processed using the DVn algorithm in real-time as they are recorded by using a relatively simple modification to existing stereo recording apparatus. A cinematographer, videographer or digital photographer can thereby optimize camera convergence and the amount of the DVn effect to apply (the d, a and b parameters) right on the spot as the images are captured. Simple modifications to videogame and 3D design software will also allow viewing of DVn images in realtime. Post-production can apply the DVn procedure to images so long as stereo pairs are available for processing. There are very few parameters to adjust, or "knobs" to turn, so the procedure is quite robust and does not require constant "tweaking."

DETAILED DESCRIPTION OF THE INVENTION

Figure 1:
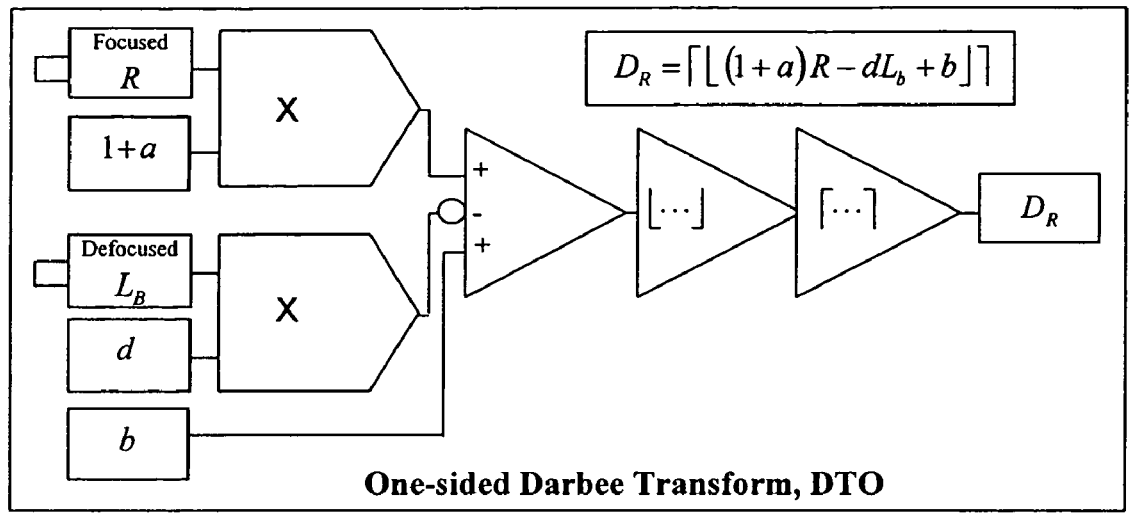
FIG. 1 is a block mathematical diagram of apparatus for carrying out the canonical Darbee Transform.
Figure 2:
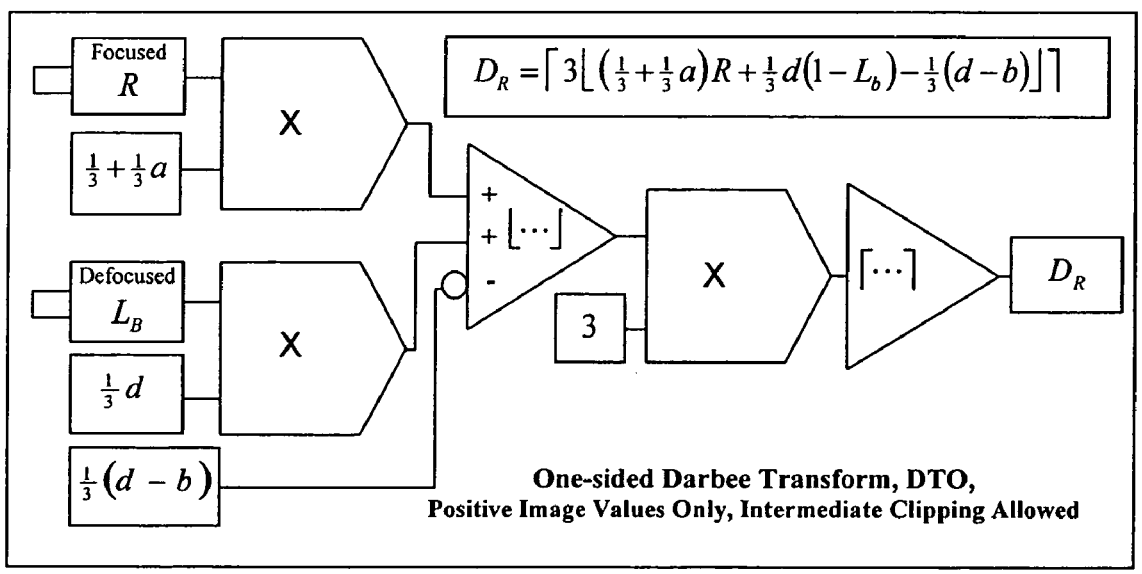
FIG. 2 is a block diagram of apparatus for carrying out the Darbee Transform without any intermediate values going above white (1) or below black (0).

DarbeeVision, abbreviated DVn, is a method of adding stereo (3D) information to a normal flat (2D) image using a procedure called the Darbee Transform.

In the One-sided Darbee Transform, (DTO), the additional information is supplied by an additional camera looking at a natural scene, or an additional viewport looking at a synthesized 3D virtual world. The additional camera is horizontally displaced from the primary camera by an interoccular distance, typically 2 to 3 inches, corresponding to the distance between the two human eyes. For special effects, the cameras can be spaced less than the interoccular distance, resulting in hypostereo, or they can be spaced more than the interoccular distance, resulting in hyperstereo. The additional camera can correspond to either the left or the right eye, with the remaining eye being the original view.

In the Symmetrical Darbee Transform, (DTS), the additional information is supplied by two additional cameras looking at a natural scene, or two additional viewports looking at a synthesized 3D virtual world. Typically the additional cameras are horizontally displaced from the primary camera by half the interoccular distance. The Generalized Symmetrical Darbee Transform allows for any number of pairs of additional cameras.

| | Definitions |
|---|---|
| R | right image, focused |
| L | left image, focused |
| C | center image, focused |
| $L_b$ | left image, defocused (b stands for blur) |
| $R_b$ | right image, defocused |
| $D_R$ | DVn processed image, with L image information added |
| $D_L$ | DVn processed image, with R image information added |
| $D_C$ | DVn processed image, with both L and R image information added |
| a | DVn gain parameter (contrast) for main image |
| d | DVn gain parameter (contrast) for blurred image |
| b | DVn offset parameter (brightness) |
| 0 | pixel value representing black |
| 1 | pixel value representing white |
| $\lfloor \ldots \rfloor$ | clip at black (0) |
| $\lceil \ldots \rceil$ | clip at white (1) |

All quantities range from 0 to 1, i.e. $0 \leq x \leq 1$.

One-sided Darbee Transform

The canonical One-sided Darbee Transform with left image information added is $$D_R = \lceil \lfloor (1+a)R - dL_b + b \rfloor \rceil, \quad \text{Eq. 1}$$

or with right image information added, it is $$D_L = \lceil \lfloor (1+a)L - dR_b + b \rfloor \rceil. \quad \text{Eq. 2}$$

One can see that the core procedure is to defocus and subtract one image from the other.

This transform can be implemented mathematically pixel-by-pixel, but it requires that intermediate terms, such as (1+a)R, take on values that are whiter-than-white (>1), and that $-dL_b$ go blacker-than-black (<0).

In the case of color images, each of the red, green and blue (RGB) channels (or their linear vector equivalents, such as YUV or YIQ) must be processed independently.

Implementing the Darbee Transform Mathematically

If the source is a computation such as 3D graphics for a video game, then a real time convolver is required, but the pixel image inversions, additions and clippings are simple pixel operations. Using the canonical One-sided Darbee Transform, the pixel operations to create $D_R$ are just Multiply the right image R by (1+a), i.e. (1+a)R.

Multiply the left image L by d, i.e. dL.

Subtract the left image term from the right image term, i.e. $(1+a)R - dL_b$.

Add the brightness value b.

Clip the resultant term at black, i.e. $\lfloor (1+a)R - dL_b + b \rfloor$.

Clip the resultant term at white, i.e. $\lceil \lfloor (1+a)R - dL_b + b \rfloor \rceil$.

FIG. 1 shows an image-processing block diagram implementing the One-sided Darbee Transform for $D_R$.

Darbee Transform Allowing Intermediate Clipping

Many image processing programs, such as Adobe Photoshop™, do not allow pixel operations that go above white or below black, or if they do, they may clip intermediate values at white (1) or black (0) before proceeding to the next operation. Therefore, we will develop a version of the Darbee Transform such that, when intermediate clipping occurs, only pixel values that would have ended up being clipped regardless will be affected.

In what follows, we will examine the case where $D_R$ is obtained by adding the left image information, but the opposite case for $D_L$ is easily obtained by interchanging the terms L and R.

Beginning with Eq. 1, the canonical DVn transform (DTO), $$D_R = \lceil \lfloor (1+a)R - dL_b + b \rfloor \rceil, \quad \text{Eq. 3}$$

$$D_R = \lceil \lfloor (1+a)R + d - d - dL_b + b \rfloor \rceil, \quad \text{Eq. 3}a$$

we write $$D_R = \lceil \lfloor R + aR - d + d(1-L_b) + b \rfloor \rceil. \quad \text{Eq. 4}$$

The quantity $1-L_b$ is simply the inverted defocused image $L_b$, which looks like an ordinary photographic negative. Its pixels clearly remain in the range $0 \leq x \leq 1$, so no clipping occurs.

Eq. 4 can be rearranged as $$D_R = \lceil \lfloor (1+a)R + d(1-L_b) - d + b \rfloor \rceil. \quad \text{Eq. 5}$$

The terms $(1+d)R + d(1-L_b)$, prior to clipping, sum to a value which is always positive with a range from 0 to 3. 3 is attained when d=1, R is white and $L_b$ is black. To prevent clipping while the two terms are accumulated, we simply prescale them by ⅓, thus $$D_R = \left\lceil 3 \left\lfloor \left(\frac{1}{3} + \frac{1}{3}a\right)R + \frac{1}{3}d(1-L_b) - \frac{1}{3}(d-b) \right\rfloor \right\rceil. \quad \text{Eq. 6}$$

Now no intermediate operations will exceed 1, even when d=1, R=1 and $L_b$=0. Subtracting ⅓ d will cause clipping at black, but those pixel values would have ended up clipped anyhow. Multiplying by 3 will clip at white, as would have occurred regardless.

In words, the procedure is:

1. Diminish the R image contrast to $$\frac{1}{3} + \frac{1}{3}a,$$

its original value.

2. Diminish the negative image $(1-L_b)$ contrast to $$\frac{1}{3}d$$

its original value.
3. Add (mix) the two contrast-diminished images together.
4. Subtract $$\left[\frac{1}{3}(d-b)\right]$$

from the mixed image by reducing its brightness by $$\left[\frac{1}{3}(d-b)\right].$$

The image-processing program will clip any negative pixel values at black.
 5. Increase the contrast of the mixed images by 3 and allow the image-processing program to clip the final values at white.

FIG. 1 shows an image-processing block diagram implementing the One-sided Darbee Transform for $D_R$ which allows intermediate clipping and uses a photographic negative image in place of a mathematical image with negative pixel values.

Symmetrical Darbee Transform

With the Symmetrical Darbee Transform, information from three images L, C, and R is combined. The position of the center camera, C is typically midway between the L and R cameras.

The canonical Symmetrical Darbee Transform is $$D_C = \left[\left|(1+a)C - \frac{d}{2}L_b - \frac{d}{2}R_b + b\right|\right]. \qquad \text{Eq. 7}$$

Following the steps above, the version suitable for use by ordinary image-processing programs is $$D_C = \left[3\left|\left(\frac{1}{3}+\frac{1}{3}a\right)R + \frac{1}{6}d(1-L_b) + \frac{1}{6}d(1-R_b) - \frac{1}{3}(d-b)\right|\right]. \qquad \text{Eq. 8}$$

Generalized Symmetrical Darbee Transform

Note that it is algorithmically possible to use more than two additional cameras added as pairs of n cameras. In that case, the Symmetrical Darbee Transform generalizes to $$D_C = \left[\left|(1+a)C + b - \frac{d}{2n}\sum_{i=1}^{n}(L_{bi}+R_{bi})\right|\right]. \qquad \text{Eq. 9}$$

Here there are i pairs of defocused cameras displaced symmetrically about the center camera.

It is also possible to weight the added camera pairs by a function $f_i$ which decreases a distance i from the center camera, which ranges ($0 \leq f_i \leq 1$), and whose sum $$\sum_{i=1}^{n} f_i = 1,$$

thus:

$$D_C = \left[\left|(1+a)C + b - \frac{d}{2}\sum_{i=1}^{n} f_i(L_{bi}+R_{bi})\right|\right]. \qquad \text{Eq. 10}$$

The Defocused Image

Using optics with visible light, defocusing is trivial. Algorithmically, the same effect can be achieved by a mathematical convolution of an image with a two-dimensional convolution kernel. This operation corresponds to a spatial low-passing of the image.

The kernel is an even function typically decreasing symmetrically from 1 at the center pixel to 0 on both sides. The one-dimensional shape of the kernel (along a diameter) can be a rectangle, a tent, a gaussian, or some other function. Two-dimensionally, the kernel can take the shape of a circle, a square, or something else. Its width w can be from one to several pixels on each side, plus the center pixel.

Practical Parameter Values

In practice, successful results have been achieved for a 640 by 480 pixel images using a two-dimensional circular convolution kernel whose diameter is in the shape of a gaussian with a width w (or diameter) of 15 pixels total. Presumably, w should scale with the image resolution, with a value of two percent of the width of the image in pixels being reasonable. The diameter in pixels should be an odd number. For high-resolution images, the computation cost of the convolution operation will be high, although, as stated previously, simple optical defocusing achieves the same result trivially.

The d parameter can typically range from $$\frac{1}{4}$$

to $$\frac{3}{4},$$

with $$\frac{1}{2}$$

being a good compromise.

The a parameter can be left at 0 or it can be linked to d, with a typical linkage ranging from $$\frac{1}{3}d$$

to d.

The b parameter can usually be left at 0. It can also be linked to d by setting it to a value such as $$\frac{1}{3}d.$$

In order to make videos or movies in DarbeeVision, it is highly desirable for the processed image to be viewable in real time, so that the camera convergence and the parameters w, d, a and b can be varied as the scene requires. If the source of the image is optical, camera defocusing and a video mixing board are all that is required.

A Method of Implementing the Darbee Transform Using Film Only

The foregoing methods of implementing the Darbee Transform require that the image information be available in video or computer form, i.e. as arrays of pixel values. When it is desired for the image to remain always on film, a post-processing method can be implemented using an optical printer.

The procedure can be understood using Eq. 4, repeated here for convenience:

$$D_R=[\lfloor R+aR-d+d(1-L_b)+b\rfloor]. \qquad \text{Eq. 4}$$

First, the R image is reduced in contrast by a factor a using a neutral-density filter, and the negative image $1-L_b$ is likewise reduced in contrast by a factor d. Then one optically mixes the reduced-contrast R image with the reduced-contrast defocused negative image $1-L_b$. That reduced-contrast combined image $aR+d(1-L_b)$ is then optically mixed with the R image to create $R+aR+d(1-L_b)$. That image is printed to the final master print, but underexposed by a factor of d+b.

Using Adobe Photoshop™ to Implement the Darbee Transform

The Darbee Transform basically involves blurring and subtracting one image of a stereo pair from the other image. Because image subtraction is not a commonly available image-processing option, a negative (inverted) image is instead added. This simple procedure is easily accomplished in Adobe Photoshop™ by following the steps below. Movies can also be processed similarly frame-by-frame using Adobe Premiere™ or similar programs.

1. One first opens the image file desired to be processed using the DarbeeVision (DVn) procedure. One can use Ctrl-O to do this. We will assume that the image file contains a stereo pair of images arranged side-by-side for "cross-eyed viewing," i.e. with the right-eye image on the left and the left-eye image on the right.
2. Using the Rectangular Marquee Tool, outline the image on the right.
3. Cut out the outlined image using Ctrl-X.
4. Create a new layer either by using the Layer menu or by typing Alt-L Alt-W Alt-L. A new layer will appear on the Layer menu, but one will not see anything else appear on the screen.
5. Paste the cut image onto the new layer using Ctrl-V.
6. Invert the pasted image (make it a negative image) using Ctrl-I, or by using the Image>Adjust>Invert menu command.
7. Set the opacity of the inverted image to 50% using the Opacity control in the Layer menu.
8. Select the Move Tool and slide the inverted image to the left over the other image. One can use the arrow keys to fine-tune the placement of the image so that the object of most interest has the best convergence.
9. Using the Filter>Blur>Gaussian Blur . . . menu command, call up the Gaussian Blur menu. Set the blur radius to a number of pixels that is approximately one-hundredth the width of the image in pixels. One can experiment with different radii to achieve a pleasing "glow" around features in the image. Images that have a lot of disparity (areas that are misconverged) generally will need a larger blur radius.
10. Use the Crop Tool to select the borders of the overlaid image. Sometimes one will have to crop part of the borders of the image if it was necessary to misregister the two images in order to achieve the convergence wanted. One also might want to crop borders where the Gaussian blur shows up due to boundary conditions.
11. Press the Enter key to crop the image.
12. Set the Opacity to 25%.
13. If it is desired to save the original right image, turn off Layer 1 by clicking on its eye icon.
14. One can now save the original unaltered image using Ctrl-Shift-S. Rename the image with a "_R" suffix to show that it is the right image of the pair, and change its format to jpg using the dropdown format menu. One can accept the default jpg options when the menu appears.
15. Now turn Layer 1 back on by clicking on its eye icon.
16. Flatten the image down to one layer (the background) by using Alt-L Alt-F, or by using the Layer>Flatten Image menu command.
17. Increase the image contrast by 50% using Alt-I Alt-A Alt-C or by using the Image>Adjust>Brightness/Contrast menu command. Leave the brightness at 0.
18. One can now save the processed image using Ctrl-Shift-S. One can add the suffix "_O25_R08_C50" to designate it as using an Opacity of 25%, a Gaussian blur radius of 8 and a final contrast increase of 50%. One can accept the default jpg options when the menu appears.
19. The procedure is now complete. The image has been enhanced using the DarbeeVision algorithm. Three-dimensional information has been added to a two-dimensional image in such a way that objectionable double-image artifacts do not appear. There is also a contrast-stretching effect that makes the image appear more vibrant, along with an image-sharpening effect that makes the image appear clearer.

One can experiment with other opacity values for adding the blurred-inverted image in Step 12. Higher values add more of the blurred-inverted image. If one changes the opacity in Step 12, one will have to compensate by varying the final contrast of the flattened image in Step 17. One can also experiment with varying the brightness in Step 18. When one does such experiments, it is useful to compare the results to the original right image that was saved in Step 14. Simply open the original image using Ctrl-O and place it on the screen next to the DVn image.

Figure 3:
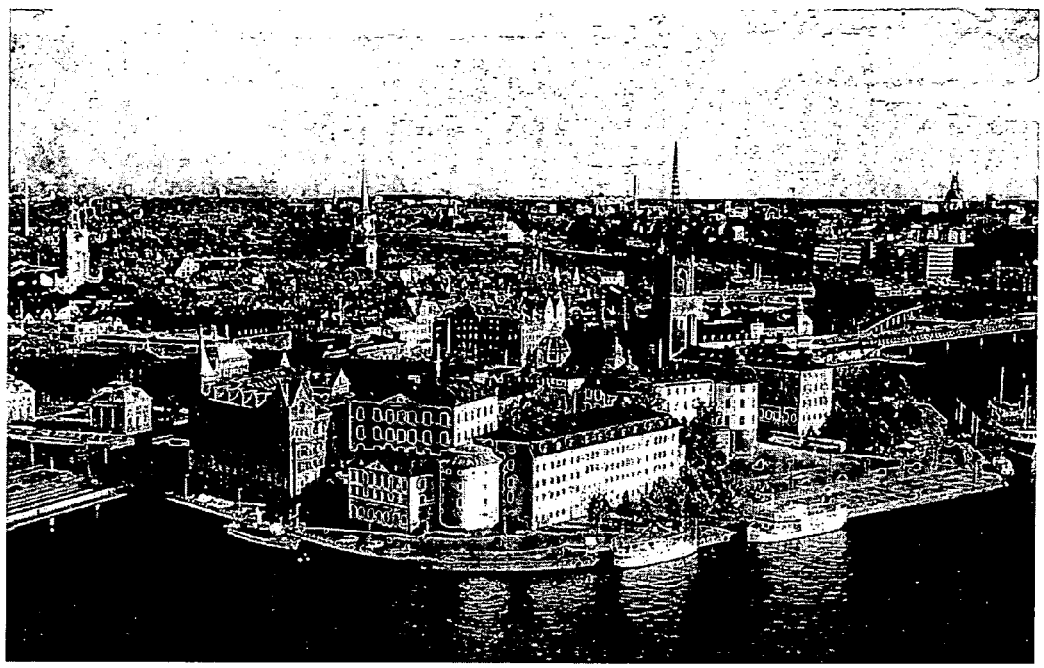
FIG. 3 is a typical image, one of a stereo pair, prior to processing using the Darbee Transform.
Figure 4:
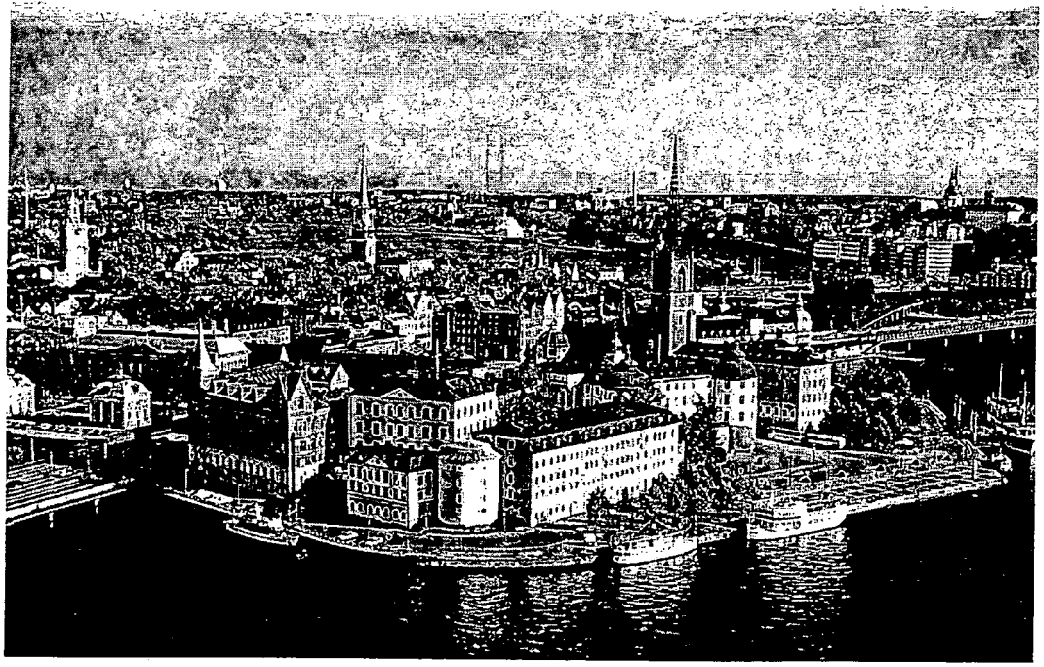
FIG. 4 is the image of FIG. 3 processed using the Darbee Transform.

A sample image is given in FIG. 3 and a DarbeeVision-processed image is given in FIG. 4.

Figure 5:
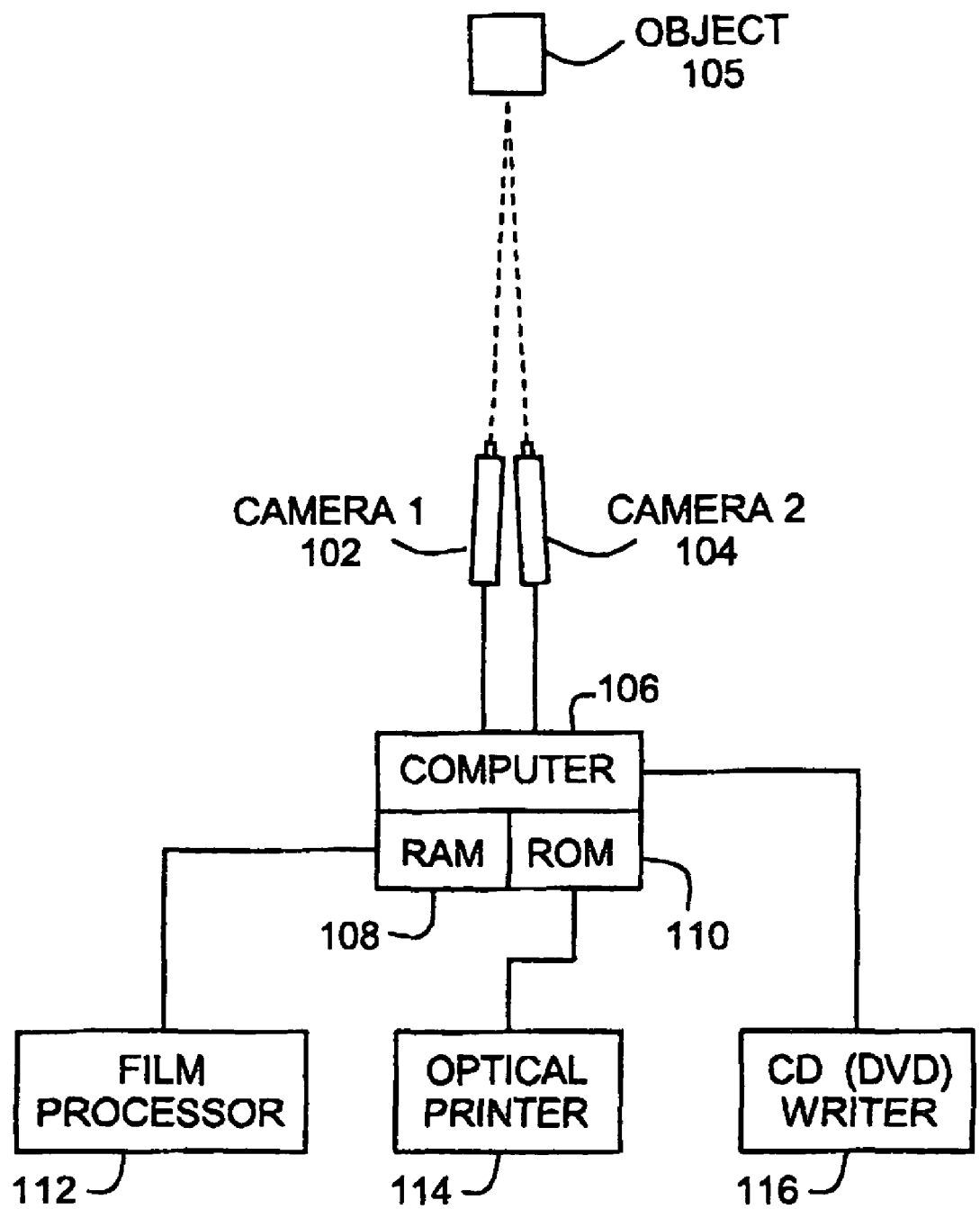
FIG. 5 is a block diagram of one apparatus for practicing the Darbee Transform method described herein.

In FIG. 5 is illustrated one apparatus 100 for carrying out the DarbeeVision method for processing images. The apparatus 100 includes a first camera 102 and a second camera 104 focused on an object 105. A computer 106 is coupled to the cameras 102 and 104 and includes a RAM 108 and a ROM 110. Film processing circuitry 112 is coupled to the computer 106. An optical printer 114 and a CD(DVD) writer 116 are also coupled to the computer 106. The cameras 102 and 104 can be still cameras, moving picture cameras or video cameras.

Software is provided, stored in the RAM 108 or the ROM 110, for blurring and subtracting one image of a stereo pair from the other image of the same pair. The stereo pair can be captured using film or with a video apparatus or a digital camera.

The stereo pair alternatively can be derived from two viewports within a three-dimensional computer-generated scene. Also, the image processing by the film processing circuitry 112 can be performed as the stereo pair is captured or in post-production after the stereo pair is captured.

The image blurring can be performed by optical defocusing or by a mathematical convolution operation.

The image subtraction can be performed by creating a negative of the image to be subtracted and adding it to the other image of the stereo pair.

In the computer 106 or in the film processing circuitry the contrast of the unblurred image is inked to the contrast of the blurred image.

Alternatively, the contrast of the unblurred image is adjusted independently with respect to the contrast of the blurred image and the combined image can be linked to the contrast of the blurred image.

The brightness of the combined image can be adjusted independently with respect to the contrast of the blurred image.

The convergence of the combined image can be adjusted as the stereo pair is captured. Further, the convergence of the combined image can be adjusted during post production by spatially translating one image with respect to the other.

In using the DarbeeVision method, a minimum distance can be established between a viewpoint for the unblurred image and a viewpoint of the blurred image which is in the range of about one pixel and can be as low as zero.

Preferably, the contrast of the unblurred and blurred images, and the brightness of the combined images are all reduced to avoid black or white clipping during processing, and a final step is provided of increasing the contrast of the combined image.

The images remain in film format and the processing is performed using the optical printer 114 and the film processing circuitry 112.

If desired, more than one blurred image can be combined with the unblurred image.

The second camera 110 preferably is of lower resolution with respect to the first camera 108. Also, the second camera 110 is preferably attached to the first camera 108, and, where possible, attached to the lens of the first camera 108.

After the processing of the digitally formatted image or sequence of images is completed, the digitally formatted data can be stored in the RAM 108 or supplied to the CD (DVD) writer 116 for burning or writing a compact disc (DVD) containing the digitally formatted image data for image(s) having enhanced contrast and a perceived enhanced depth of field.

From the foregoing description, it will be apparent that the method and apparatus of the present invention and the enhanced digital image data created, have a number of advantages, some of which have been described above, and others of which are inherent in the invention.

Also, it will be understood that modifications can be made to the method, apparatus and enhanced digital image data, without departing from the teachings of the invention. Accordingly, the scope of the invention is only to be limited as necessitated by the following claims.

We claim:

1. A method for altering a single two-dimensional resultant image, using three-dimensional information contained in a plurality of two-dimensional source images, using a program stored in a computer, each image depicting a scene from a spatially distinct point of view, the program using the procedure of subtracting, from a single one of said source images, a blurred version of each one of the remaining source images for altering the information in a physical image which can be printed on a printer.

2. The method of claim 1 wherein said spatially distinct points of view are horizontally displaced from one another.

3. The method of claim 1 wherein said plurality of source images corresponds to a single frame in a sequence of frames from a movie or video.

4. The method of claim 1 wherein the said plurality of source images is captured using film.

5. The method of claim 1 wherein said plurality of source images is captured electronically using video apparatus.

6. The method of claim 1 wherein said plurality of source images is captured electronically using a digital camera.

7. The method of claim 1 wherein said plurality of source images is derived from a plurality of viewports within a three-dimensional computer-generated scene.

8. The method of claim 1 wherein said plurality of source images is generated from a single two-dimensional image.

9. The method of claim 1 wherein the image processing is performed as said plurality of source images is captured.

10. The method of claim 1 wherein the image processing is performed in post-production after said plurality of source images is captured.

11. The method of claim 1 wherein the image blurring is performed by optical defocusing.

12. The method of claim 1 wherein the image blurring is performed by a mathematical convolution operation.

13. The method of claim 1 wherein the image blurring is performed in the horizontal dimension only.

14. The method of claim 1 wherein the image subtraction is performed by creating a negative of the image to be subtracted and adding it to said single one of said source images.

15. The method of claim 1 wherein the convergence of the combined image is adjusted as said plurality of source images is captured.

16. The method of claim 1 wherein the convergence of the combined image is adjusted during post production by spatially translating each one of said plurality of source images with respect to said single one of said source images.

17. The method of claim 1 wherein the contrast of the unblurred and blurred images, and the brightness of the combined images are all reduced to avoid black or white clipping during processing, and wherein a final step of increasing the contrast of the combined image is performed.

18. Apparatus including a computer having an image altering program stored therein for altering a single two-dimensional resultant image, using three-dimensional information contained in a plurality of two-dimensional source images, each depicting a scene from a spatially distinct point of view, wherein said program in said apparatus uses circuitry for subtracting, from a single one of said source images, a blurred version of each one of the remaining source images, and said apparatus includes circuitry implemented by said program for blurring said remaining source images.

19. Apparatus of claim 18 wherein said spatially distinct points of view are horizontally displaced from one another.

20. Apparatus of claim 18 wherein said plurality of source images corresponds to a single frame in a sequence of frames from a movie or video.

21. Apparatus of claim 18 comprising means including film for capturing said plurality of source images.

22. Apparatus of claim 18 comprising means including a digital camera for electronically capturing said plurality of source images.

23. Apparatus of claim 18 comprising means including video apparatus for electronically capturing said plurality of source images.

24. Apparatus of claim 18 comprising means for deriving said plurality of source images from a plurality of viewports within a three-dimensional computer-generated scene.

25. Apparatus of claim 18 comprising means for generating said plurality of source images from a single two-dimensional image.

26. Apparatus of claim 18 including means for processing said plurality of source images in real time so as to allow the viewing of the processed image as said plurality of source images is being captured.

27. Apparatus of claim 18 wherein means are provided for processing said plurality of source images after capturing.

28. Apparatus of claim 18 wherein means are provided for processing said resultant image as said plurality of source images is captured.

29. Apparatus of claim 18 wherein the image processing is performed in post-production after said plurality of source images is captured.

30. Apparatus of claim 18 including optical defocusing means for image blurring.

31. Apparatus of claim 18 including mathematical convolution means for image blurring.

32. Apparatus of claim 18 including image blurring means for blurring in the horizontal dimension only.

33. Apparatus of claim 18 including means for creating negatives of the images to be subtracted and means for adding said negatives to said single one of said source images.

34. Apparatus of claim 18 including means for adjusting the convergence of the combined image as said plurality of source images is captured.

35. Apparatus of claim 18 including means for adjusting the convergence of the combined image during post production by spatially translating each one of said plurality of source images with respect to said single one of said source images.

36. Apparatus of claim 18 including means for reducing the contrast of the unblurred and blurred images, and means for reducing the brightness of the combined images to avoid black or white clipping during processing, and means for increasing the contrast of the combined image.

37. Apparatus of claim 18 including a plurality of cameras, of lower resolution with respect to a first camera capturing the unblurred image, for capturing the blurred images.

38. Apparatus of claim 37 including means for attaching the plurality of lower resolution cameras to the first camera.

39. Apparatus of claim 38 wherein said attaching means is constructed and arranged as an attachment to the lens of the first camera.

\* \* \* \* \*